(12) United States Patent
Li

(10) Patent No.: US 10,583,886 B2
(45) Date of Patent: Mar. 10, 2020

(54) POSTURE VEHICLE

(71) Applicants: SHENZHEN VALUELINK E-COMMERCE CO., LTD., Shenzhen (CN); SHENZHEN DYNAMIC BALANCE TECHNOLOGY CO., LTD., Shenzhen (CN)

(72) Inventor: Lifang Li, Yueyang (CN)

(73) Assignee: SHENZHEN DYNAMIC BALANCE TECHNOLOGY CO., LTD., Shenzhen (CN)

( * ) Notice: Subject to any disclaimer, the term of this patent is extended or adjusted under 35 U.S.C. 154(b) by 50 days.

(21) Appl. No.: 15/815,226

(22) Filed: Nov. 16, 2017

(65) Prior Publication Data
US 2018/0072367 A1   Mar. 15, 2018

Related U.S. Application Data

(63) Continuation of application No. PCT/CN2017/090922, filed on Jun. 29, 2017.

(30) Foreign Application Priority Data

Aug. 29, 2016 (CN) .......................... 2016 1 0749689

(51) Int. Cl.
| | |
|---|---|
| *B62K 11/00* | (2006.01) |
| *B62K 23/08* | (2006.01) |
| *A63C 17/01* | (2006.01) |
| *A63C 17/12* | (2006.01) |

(52) U.S. Cl.
CPC .......... *B62K 11/007* (2016.11); *A63C 17/014* (2013.01); *A63C 17/12* (2013.01); *B62K 23/08* (2013.01); *A63C 2203/12* (2013.01); *A63C 2203/18* (2013.01); *A63C 2203/52* (2013.01)

(58) Field of Classification Search
CPC .................................................. B62K 11/007
See application file for complete search history.

(56) References Cited

U.S. PATENT DOCUMENTS

| | | | | |
|---|---|---|---|---|
| 7,178,614 B2 * | 2/2007 | Ishii | .......................... | B60K 1/02 180/7.1 |
| 7,363,993 B2 * | 4/2008 | Ishii | ....................... | A63C 17/08 180/7.1 |
| 7,481,291 B2 * | 1/2009 | Nishikawa | ............. | B62K 17/00 180/181 |
| 8,225,891 B2 * | 7/2012 | Takenaka | ............. | B62K 11/007 180/7.1 |

(Continued)

*Primary Examiner* — Jeffrey J Restifo
(74) *Attorney, Agent, or Firm* — Wayne & Ken, LLC; Tony Hom

(57) ABSTRACT

The present invention relates to the technical field of electric vehicles, and provides an posture vehicle, which comprises a vehicle body, two wheelers pivoted to the vehicle body, pedals installed on the vehicle body, and two driving components installed in the vehicle body and driving the two wheelers to rotate driven by the pedals. The driving components and the wheelers are in the same operating plane. Namely, in a using process, the user treads on the wheelers, thereby eliminating interference of a balance state of the vehicle body to an output signal of the driving components, and enhancing the sensitivity of the driving components for judging the balance signal.

19 Claims, 9 Drawing Sheets

(56) References Cited

U.S. PATENT DOCUMENTS

| | | | | |
|---|---|---|---|---|
| 8,738,278 B2* | 5/2014 | Chen | ................... | B62K 11/007 |
| | | | | 701/124 |
| 9,101,817 B2* | 8/2015 | Doerksen | ............... | A63C 17/12 |
| 9,376,155 B2* | 6/2016 | Ying | ................... | B62D 51/001 |
| 9,400,502 B2* | 7/2016 | Kamen | ................. | A63C 17/01 |
| 9,452,345 B2* | 9/2016 | Doerksen | ............ | A63C 17/01 |
| 9,604,692 B1* | 3/2017 | Kim | ...................... | B62K 23/08 |
| 9,745,013 B2* | 8/2017 | Wood | ................... | B62K 11/007 |
| 9,840,302 B2* | 12/2017 | Zeng | .................... | B62K 11/007 |
| 9,896,146 B2* | 2/2018 | Lu | ........................... | B60K 1/04 |
| 9,999,827 B2* | 6/2018 | Wood | .................... | A63C 17/12 |
| 10,040,503 B2* | 8/2018 | Chen | ................... | B62K 11/007 |
| 10,059,397 B2* | 8/2018 | Zheng | ................. | B62K 11/007 |
| 10,112,680 B2* | 10/2018 | Doerksen | ............ | B60K 7/0007 |
| 10,144,478 B2* | 12/2018 | Ying | ................... | B62K 11/007 |
| 10,167,036 B2* | 1/2019 | Ying | ................... | B62D 51/001 |
| 10,252,724 B2* | 4/2019 | Edney | .................. | B60W 40/13 |
| 10,286,974 B2* | 5/2019 | Yang | .................... | B62K 11/007 |
| 10,293,243 B1* | 5/2019 | Doerksen | ............... | A63C 17/12 |
| 2006/0260862 A1* | 11/2006 | Nishikawa | ............. | B62K 17/00 |
| | | | | 180/315 |
| 2010/0114468 A1* | 5/2010 | Field | .................... | B60N 2/045 |
| | | | | 701/124 |
| 2012/0166048 A1* | 6/2012 | Inoue | ................... | G05D 1/0061 |
| | | | | 701/49 |
| 2013/0238231 A1* | 9/2013 | Chen | ................... | B62K 11/007 |
| | | | | 701/124 |
| 2014/0326525 A1* | 11/2014 | Doerksen | ............... | A63C 17/12 |
| | | | | 180/181 |
| 2015/0096820 A1* | 4/2015 | Strack | .................. | B62K 11/007 |
| | | | | 180/181 |
| 2016/0129963 A1* | 5/2016 | Ying | ................... | B62D 51/001 |
| | | | | 180/6.5 |
| 2017/0183053 A1* | 6/2017 | Zeng | .................... | B62K 11/007 |

\* cited by examiner

POSTURE VEHICLE

CROSS REFERENCE TO RELATED APPLICATIONS

The application claims priority to a Chinese patent application with application number of 201610749689.7 and titled as "posture vehicle" filed on Aug. 29, 2016 to Patent Office of the People's Republic of China, disclosures of which are incorporated herein by reference in their entireties.

TECHNICAL FIELD

The present invention relates to the technical field of electric vehicles, and more specifically, to a posture vehicle.

BACKGROUND

A posture vehicle is also called as a motion sensing vehicle or an electric personal assistive mobility device. The posture vehicle has an operation principle as follows: change of an posture of a vehicle body is detected by using a gyroscope and an acceleration sensor inside the vehicle body; and a motor is accurately driven by using a servo control system to ensure balance of the vehicle body.

At present, a control mode of the posture vehicle is as follows: a control pedal is installed on a pedaling region of the vehicle body; advancing, backing, turning and stop of the vehicle body are completed by a user through different applied forces on a front end and a rear end of the control pedal, i.e., a "foot control" mode. However, the control pedal can only move along with the vehicle body but fails to move relative to the vehicle body, so induction sensitivity is low, causing that actual operation and control of the user are difficult and balance experience is poor. Especially, it is difficult to keep stable driving of the vehicle body in a process of getting on the vehicle.

SUMMARY

In conclusion, the purpose of embodiments of the present invention is to provide an posture vehicle, in order to overcome problems of difficult operation and low induction sensitivity in using the control pedal to operate and control the posture vehicle in the prior art.

Embodiments of the present invention are realized as follows:

An posture vehicle comprises: a vehicle body, two wheels pivoted to the vehicle body, pedals installed on the vehicle body, and two driving components installed in the vehicle body which drives the wheels to rotate through the pedals. Wherein each of the wheel comprises a stator fixing shaft pivoted to the vehicle body and a rotor-driven wheel connected to the stator fixing shaft. Each of two driving components is electrically connected to its respective rotor-driven wheel. Two driving components are installed in parallel with an certain interval in the vehicle body and respectively fixed and connected to the stator fixing shafts of their corresponding rotor-driven wheels. When there is an inclined angle generated between each driving component and the horizontal plane, a driving signal is output to the corresponding rotor-driven wheel so that the driving components tend to achieve a dynamic balancing status.

Further, the driving components comprise a horizontal plate coupled with the driving components, and the horizontal plate is fixed on and connected to the stator fixing shaft in the vehicle body, two elastic pieces respectively installed in the pedal at the front end and at the rear end of the horizontal plate which touch against an interior wall of the vehicle body when there is an inclined angle between the horizontal plate and the horizontal plane, and a control system adapted with the horizontal plate, outputs a driving signal to the rotor-driven wheels when there is an inclined angle between the horizontal plate and the horizontal plane. The control system is electrically connected to the rotor-driven wheels.

Further, the driving components comprise a horizontal plate coupled with the driving component, and the horizontal plate is fixed on and connected to the stator shaft in the vehicle body, two elastic pieces respectively installed in the vehicle body which touch against the front end and the rear end of the horizontal plate when there is an inclined angle between the horizontal plate and the horizontal plane, and a control system, adapted with the horizontal plate, outputs a driving signal to the rotor-driven wheels when there is an inclined angle between the horizontal plate and the horizontal plane. The control system is electrically connected with the rotor-driven wheels.

Further, a first supporting seat for supporting the stator fixing shaft is installed in the vehicle body. A first bearing is installed in the first supporting seat. The stator fixing shaft is installed throughout the first bearing.

Further, a second supporting seat for supporting the stator fixing shaft is also installed in the vehicle body. The second supporting seat and the first supporting seat are oppositely installed. A second bearing is installed in the second supporting seat. The stator fixing shaft is respectively installed through the first bearing and the second bearing and is between the first supporting seat and the second supporting seat.

Further, two rotor-driven wheels are respectively installed on both sides of the vehicle body, and are mutually parallel. Two driving components are located between the two rotor-driven wheels.

Further, the two rotor driving wheels are installed in the vehicle body, and present an acute angle. Two driving components are respectively located at outer sides of the two rotor-driven wheels.

Further, the vehicle body comprises a top housing and a bottom housing buckled vertically. Pedals are two flexible pedal regions installed on the top housing and corresponding to the driving components vertically.

Further, the flexible pedal regions are provided with skid-proof grains.

Compared with the prior art, in the posture vehicle provided in embodiments of the present invention, each wheeler comprises a stator fixing shaft pivoted to the vehicle body and a rotor-driven wheel connected to the stator fixing shaft. The vehicle body can rotate around the rotor-driven wheel relative to the stator fixing shaft. The driving components are fixedly connected to the stator fixing shafts. The driving components can swing with the stator fixing shafts opposite to the vehicle body. In this way, the driving components and the wheels are in the same operating plane. Namely, in a using process, a user treads on the wheelers, thereby eliminating interference of a balance state of the vehicle body to an output signal of the driving components, i.e., an entire driving mode of the posture vehicle is only stimulated by a balance signal source of the driving components relative to the horizontal plane. Therefore, the user only needs to operate and control the driving components so as to generate an angle relative to the horizontal plane, thereby sending a driving signal to the corresponding rotor-driven wheel to obtain a corresponding travel state. This connection mode enhances the sensitivity of the driving components for judging the balance signal, so that the user is easier to operate and especially easier to get on the vehicle, thereby simplifying the vehicle body structure and reducing production cost.

DETAILED DESCRIPTION

Figure 1:
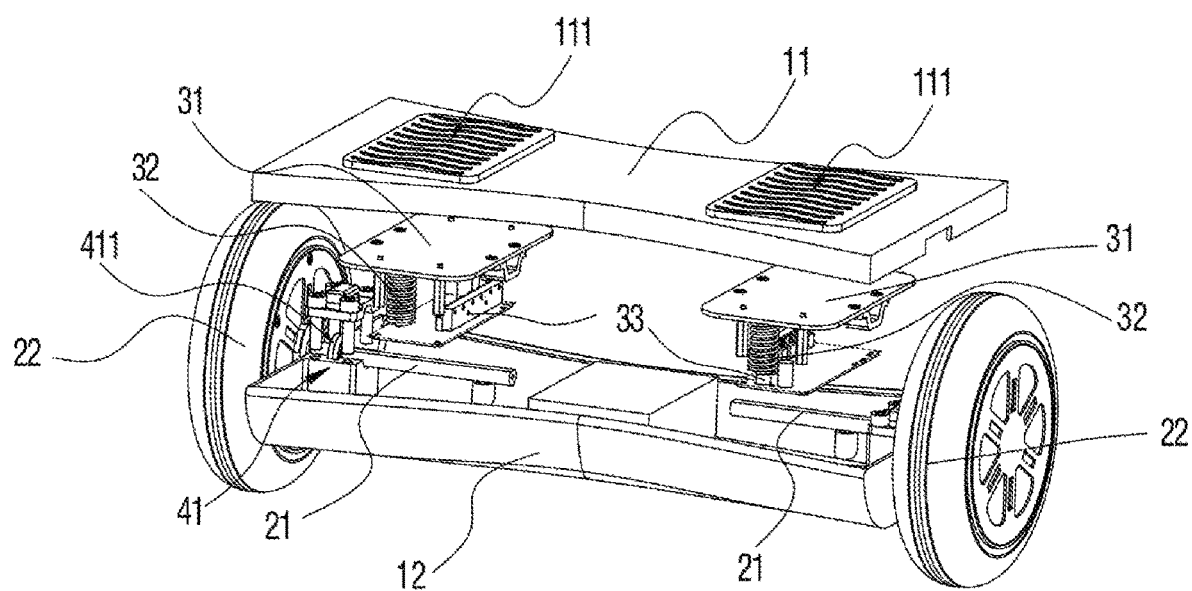
FIG. 1 is an exploded view of an posture vehicle provided in an embodiment 1 of the present invention.

To clarify purposes, technical solutions as well as advantages of the present invention clear, the present invention will be further described in detail below in combination with drawings and embodiments. It should be understood that specific embodiments described herein are only used for explaining the present invention, but not to limit the present invention.

It should be noted that when an element is expressed as "fixed to" or "installed on" another element, the element can be directly on another element or indirectly on another element. When an element is expressed as "connected with" another element, the element can be directly connected with another element or indirectly connected with another element.

It should also be noted that words of directions such as left, right, upper, lower, top, bottom and the like in the present embodiment are only relative concepts to refer to a normal use state of the product, and should not be considered as a limit for the present invention.

The application details of the present invention are described below in combination with specific embodiments.

A posture vehicle comprises: a vehicle body, two wheels pivoted to the vehicle body, pedals installed on the vehicle body, and two driving components installed in the vehicle body which drives the wheels to rotate through the pedals. Wherein each of the wheels comprises a stator fixing shaft pivoted to the vehicle body and a rotor-driven wheel connected to the stator fixing shaft. Each of two driving components is electrically connected to its respective rotor-driven wheel. Two driving components are installed in parallel with a certain interval in the vehicle body and respectively fixed and connected to the stator fixing shafts of their corresponding rotor-driven wheels. When there is an inclined angle generated between each driving component and the horizontal plane, a driving signal is output to the corresponding rotor-driven wheel so that the driving components tend to achieve a dynamic balancing status.

A posture vehicle provided in embodiments of the present invention has the following operation principle: each wheel comprises a stator fixing shaft pivoted to the vehicle body and a rotor-driven wheel connected to the stator fixing shaft. The vehicle body can rotate around the stator fixing shaft relative to the rotor driving wheel. The driving components are fixedly connected to the stator fixing shafts. The driving components can swing with the stator fixing shafts opposite to the vehicle body. In this way, the driving components and the wheels are in the same operating plane. Namely, in a using process, a user treads on the wheelers, thereby eliminating interference of a balance state of the vehicle body to an output signal of the driving components, i.e., an entire driving mode of the posture vehicle is only stimulated by a balance signal source of the driving components relative to the horizontal plane. Therefore, the user only needs to operate and control the driving components so as to generate an angle relative to the horizontal plane, thereby sending a driving signal to the corresponding rotor driving wheel to obtain a corresponding travel state. This connection mode enhances the sensitivity of the driving components for judging the balance signal, so that the user is easier to operate and especially easier to get on the vehicle, thereby simplifying the vehicle body structure and reducing production cost.

Embodiment 1

Figure 2:
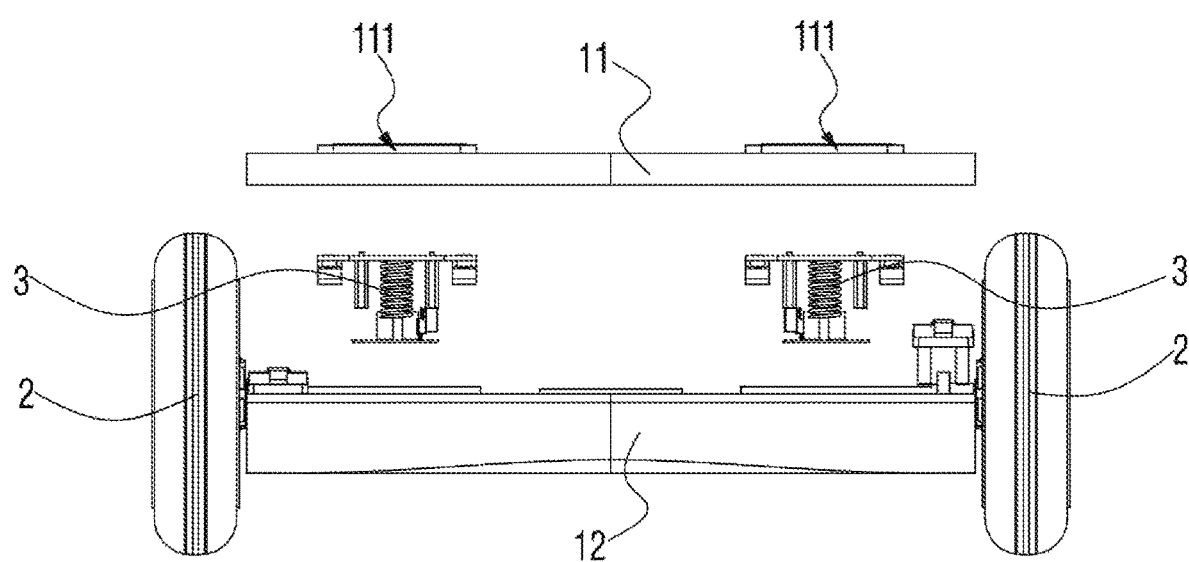
FIG. 2 is a rear view of FIG. 1.
Figure 3:
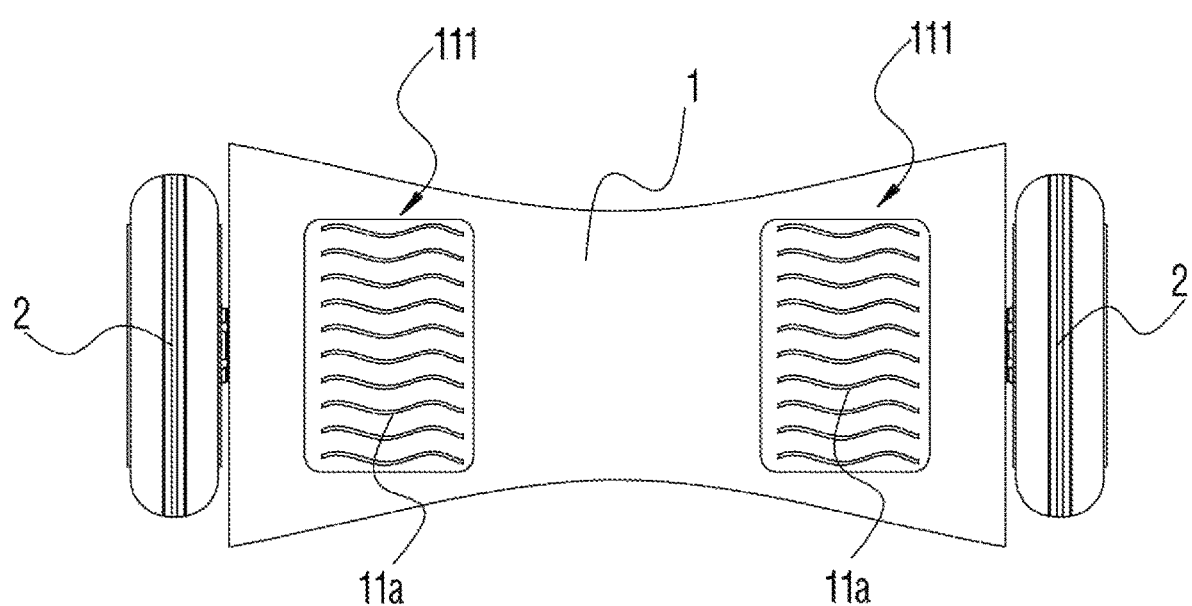
FIG. 3 is a top view of an posture vehicle provided in an embodiment 1 of the present invention.
Figure 4:
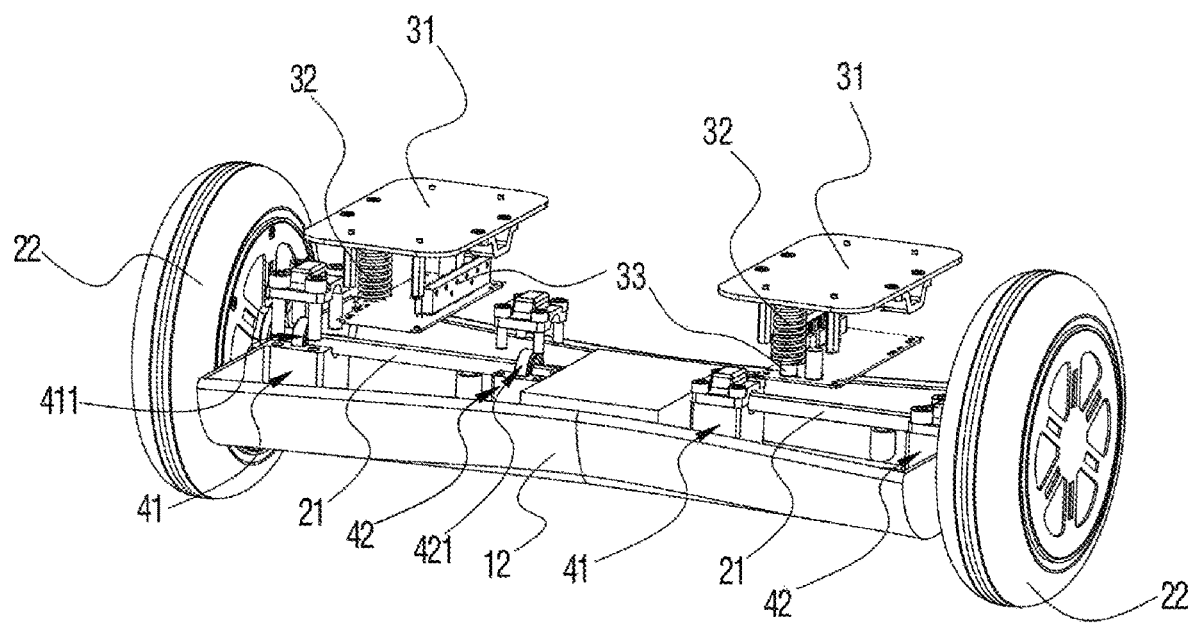
FIG. 4 is another exploded view of a posture vehicle provided in an embodiment 1 of the present invention.

By referring to FIG. 1, FIG. 2 and FIG. 3, a posture vehicle provided in embodiments of the present invention comprises a vehicle body 1, two wheels 2 pivoted to the vehicle body 1, pedals 111 installed on the vehicle body 1, and two driving components 3, installed in the vehicle body 1, to drive the two wheels 2 to rotate with the movement of the pedals 111. Each wheel 2 comprises a stator fixing shaft 21 pivoted to the vehicle body 1 and a rotor-driven wheel 22 connected to the stator fixing shaft 21. Each of the two driving components 3 is electrically connected to its respective rotor-driven wheel 22. Two driving components 3 are installed in the vehicle body 1 at an interval in parallel and are respectively fixed and connected to the stator fixing shafts 21 corresponding to the rotor-driven wheels 22. When there is an inclined angle generated between each driving component 3 and a horizontal plane, a driving signal is output to the corresponding rotor-driven wheel 22 so that the driving components 3 tend to achieve a dynamic balance. The operation principle is as follows: The vehicle body 1 can rotate around the stator fixing shaft 21 opposite to the rotor-driven wheel 22. The driving components 3 are fixed and connected to the stator fixing shafts 21. The driving components 3 can swing with the stator fixing shafts 21 opposite to the vehicle body 1. In this way, the driving components 3 and the wheels 2 are in the same operating plane. Namely, in a using process, a user treads on the wheels 2, thereby eliminating interference of a balance state of the vehicle body 1 to an output signal of the driving components 3, i.e., an entire driving mode of the posture vehicle is only stimulated by a balance signal source of the driving components 3 relative to the horizontal plane. Therefore, the user only needs to operate and control the driving components 3 so as to generate an inclined angle with the opposite horizontal plane, thereby sending a driving signal to the corresponding rotor-driven wheel 22 to obtain a corresponding travel state. This connection mode enhances the sensitivity of the driving components 3 for judging the balance signal, so that the user is easy to operate and especially easy to get on the vehicle, and meanwhile, the vehicle body structure of the posture vehicle is simplified and production cost of a product is reduced. Specifically, by referring to FIG. 1, FIG. 2 and FIG. 3 in the present embodiment, two rotor driving wheels 22 are respectively installed on both sides of the vehicle body 1, and are mutually parallel. Two driving components 3 are located between the two rotor-driven wheels 22. In this way, space between the two rotor driving wheels 22 is long, enabling the vehicle body 1 advancing stable in a traveling process and in a turning process.

Further, by referring to FIG. 1, FIG. 2 and FIG. 3, in the present embodiment, driving components 3 comprise a horizontal plate 31 coupled with the driving component, installed in the vehicle body 1, fixed and connected to the stator fixing shaft 21, two elastic pieces 32 respectively installed at a front end of the horizontal plate 31 and a rear end of the horizontal plate 31, and a control system 33 rotating along with the horizontal plate 31. The control system 33 is electrically connected with the rotor driving wheels 22. When there is an angle between the horizontal plate 31 and the horizontal plane, the control system 33 moves together with the horizontal plate 31, thereby outputting a driving signal to the corresponding rotor driving wheel 22 and realizing rotating acceleration of the rotor driving wheels 22, so that the horizontal plate 31 has a trend of being parallel to the horizontal plane, and the elastic pieces 32 installed on the front end and the rear end of the horizontal plate 31 regulates a rotating angle of the horizontal plate 31 relative to the vehicle body 1 to ensure that the horizontal plate 31 does not generate a too large angle relative to the horizontal plane. Specifically, When the user stands on the pedals 111 of the vehicle body 1 with both feet inclining forwards, corresponding horizontal plates 31 in the vehicle body 1 are triggered, so that two horizontal plates 31 generate angles of forward inclining with the horizontal plane and the two horizontal plates 31 drive the corresponding control system 33 to generate a forward inclined angle relative to the vehicle body 1. An inductor (not shown in the figure) in the control system 33 detects forward inclining movement signals of the two horizontal plates 31. At this moment, two control systems 33 output forward rotation driving signals to respective rotor driving wheels 22 to rotate forwards, and the entire posture vehicle moves forwards. Similarly, when the user stands on the pedals 111 of the vehicle body 1 with both feet inclined backwards, corresponding horizontal plates 31 in the vehicle body 1 are triggered, so that two horizontal plates 31 generate angles of backward inclining with the horizontal plane and the two horizontal plates 31 drive the corresponding control system 33 to generate a backward inclined angle relative to the vehicle body 1. An inductor (not shown in the figure) in the control system 33 detects backward inclining movement signals of the two horizontal plates 31. At this moment, two control systems 33 output backward rotation driving signals to respective rotor driving wheels 22 to rotate backwards, and the entire posture vehicle moves backwards. When an angle of a left horizontal plate 31 relative to the horizontal plane is larger than that of a right horizontal plate 31 relative to the horizontal plane, the left control system 33 outputs a rapid rotating signal to the left rotor driving wheel 22, so that the left rotor driving wheel 22 rotates more rapidly; the right control system 33 outputs a slow rotating signal to the right rotor driving wheel 22, so that the right rotor driving wheel 22 rotates more slowly, so as to realize right turning of the entire posture vehicle. Similarly, when a rotating inclined angle of a right horizontal plate 31 relative to the vehicle body 1 is larger than that of a left horizontal plate 31 relative to the vehicle body 1, the entire posture vehicle turns left. Preferably, by referring to the figure, in the present embodiment, the elastic piece 32 is a spring. The rotation of the horizontal plate 31 relative to the vehicle body 1 is limited through elasticity of the spring. Preferably, the control system 33 is installed underneath the horizontal plate 31 and rotates together with the horizontal plate 31. Of course, the control system 33 can also be installed in other positions of the horizontal plate 31 as long as the inclined angle of the horizontal plate 31 relative to the horizontal plane is detected.

Or, not shown in the figure, the difference from the above embodiment is that two elastic pieces 32 are installed in the vehicle body 1 and when the horizontal plate 31 rotates around the stator fixing shaft 21, the front end or the rear end of the horizontal plate 31 touches against the elastic pieces 32 to limit a rotating angle of the horizontal plate 31 relative to the vehicle body 1.

Further, by referring to FIG. 1, FIG. 2 and FIG. 3, in the present embodiment, a first supporting seat 41 for supporting the stator fixing shaft 21 is installed in the vehicle body 1. A first bearing 411 is installed in the first supporting seat 41. The stator fixing shaft 21 is installed throughout the first bearing 411. In this way, only one part of the stator fixing shaft 21 is pivoted to the vehicle body 1 so that the horizontal plate 31 installed on the stator fixing shaft 21 is flexible.

Or, by referring to FIG. 1, FIG. 2, FIG. 3 and FIG. 4, in the present embodiment, a second supporting seat 42 for supporting the stator fixing shaft 21 is also installed in the vehicle body 1. The second supporting seat 42 and the first supporting seat 41 are oppositely installed. A second bearing 421 is installed in the second supporting seat 42. The stator fixing shaft 21 is respectively installed throughout the first bearing 411 and the second bearing 421 and is between the first supporting seat 41 and the second supporting seat 42. In this way, the stability of the stator fixing shaft 21 between the first supporting seat 41 and the second supporting seat 42 is enhanced, and the operation process of the horizontal plate 31 installed on the stator fixing shaft 21 is smooth.

Further, by referring to FIG. 1, FIG. 2 and FIG. 3 in the embodiments, the vehicle body 1 comprises a top housing 11 and a bottom housing 12 which are buckled vertically. Pedals 111 are two flexible pedal regions installed on the top housing 11 and corresponding to the driving components 3 vertically. In this way, when the user stands on the flexible pedal regions with both feet, it is equivalent to indirectly step on the driving components 3, thereby realizing operation and control on the driving components 3. Preferably, the flexible pedal regions are made of flexible silicone gel for the convenience of the user to transmit action force to the driving components 3.

Specifically, by referring to FIG. 1, FIG. 2 and FIG. 3, in the present embodiment, the flexible pedal regions are provided with skid-proof grains 11a. In this way, frictional force between the feet and the flexible pedal regions is increased, to prevent slipping.

Embodiment 2

Figure 5:
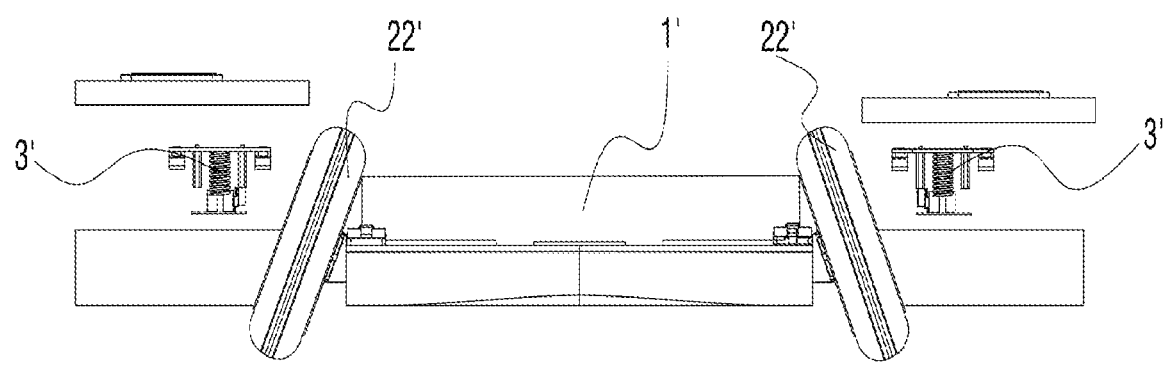
FIG. 5 is a main view of a posture vehicle provided in an embodiment 2 of the present invention.

By referring to FIG. 5, the posture vehicle provided in the present embodiment is similar to that in embodiment 1. The differences are that in the present embodiment:

the two rotor-driven wheels 22' are installed in the vehicle body 1', and present an acute angle between each wheels.

Two driving components 3' are respectively located at outer sides of the two rotor-driven wheels 22'. Namely, a spacing between upper ends of the two rotor-driven wheels 22' is larger than a spacing between lower ends of the two rotor-driven wheels 22'. In this way, a spacing between the two rotor-driven wheels 22' is reduced so that a turning radius of the posture vehicle is smaller, which enables the vehicle suitable for travel in a narrow space.

Contents not described in the present embodiment are the same as those of embodiment 1, and are not repeated herein.

Embodiment 3

Figure 6:
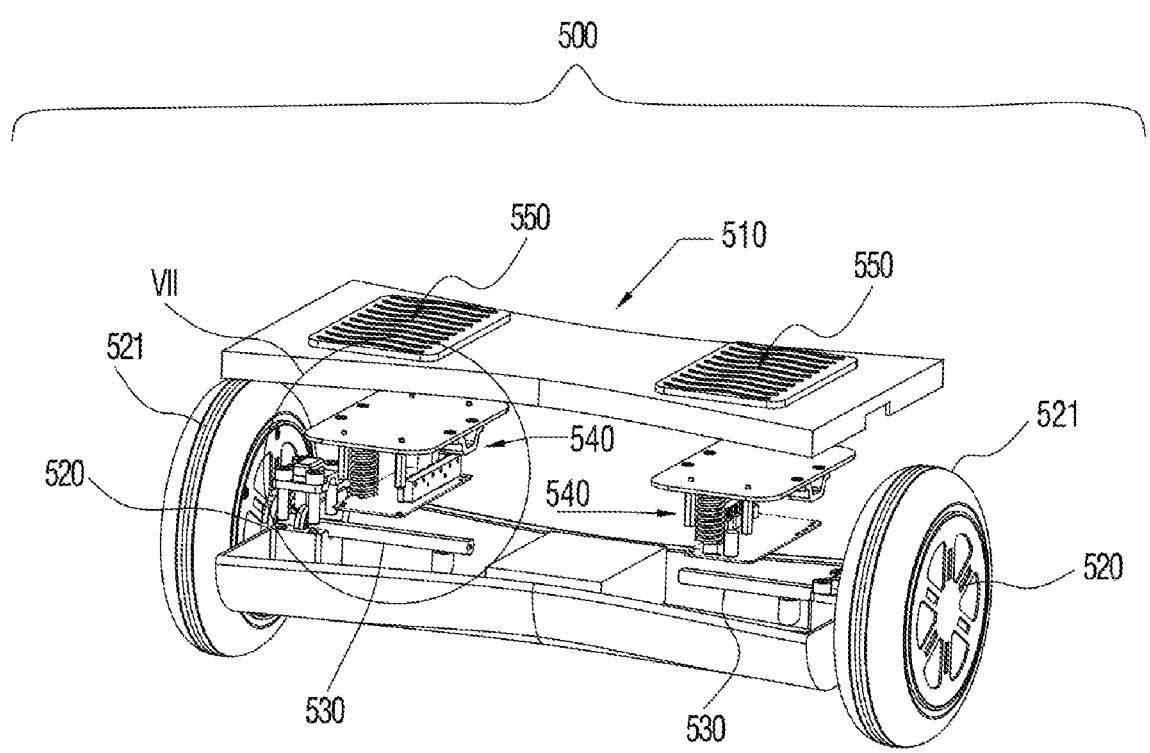
FIG. 6 is a stereoscopic structural schematic diagram of a posture vehicle provided in an embodiment 3 of the present invention.

By referring to FIG. 6, FIG. 6 is a stereoscopic structural schematic diagram of an posture vehicle 500 provided in the present embodiment. The posture vehicle 500 comprises a vehicle body 510, motors, supporting shafts 530 and driving components 540. The motors can adopt inner rotor motors, and can also adopt outer rotor motors. In the present embodiment, the motors are the outer rotor motors, and specifically are hub motors 520. Wheel bodies 521 are connected to rotors of the hub motors 520. Two hub motors 520 are respectively installed on the left side and the right side of the vehicle body 510. Two supporting shafts 530 are coaxially connected with stators of the two hub motors 520 respectively. The supporting shafts 530 are also simultaneously connected with the vehicle body 510 rotatably. In this way, the vehicle body can rotate relative to the hub motors 520. Two driving components 540 are installed in the vehicle body 510. One driving component 540 is located on the left side in the vehicle body 510, and the other driving component 540 is located on the right side in the vehicle body 510. The two driving components 540 are respectively connected to the two supporting shafts 530. Meanwhile, the left driving component 540 is electrically connected with the left hub motor 520, and the right driving component 540 is electrically connected with the right hub motor 520. Openings (not shown in the figure) corresponding to the driving components 540 are formed in the vehicle body 510. Through the openings formed in the vehicle body 510, the driving components 540 can rotate around axes of the supporting shafts 530 relative to the vehicle body under the action of external force. The driving components 540 rotate, so as to incline forwards or incline backwards relative to the horizontal plane. Through the openings formed in the vehicle body 510, both feet of the user can directly control the driving components 540 to incline forwards or incline backwards. Because the driving components 540 do not need to rotate with the vehicle body 510, rotation of the driving components 540 is more sensitive, and then a control signal is sent more sensitively to enable the hub motors 520 to rapidly realize change of rotation states. In addition, because rotating axes of the driving components 540 are coaxial with operation axes of the hub motors 520, an inclined angle of the driving components 540 can be converted more accurately and more simply into the control signal of the hub motors 520, and then rotation of the hub motors 520 is controlled more accurately, so that the user is more convenient to operate and especially easier to get on the vehicle, the structure of posture vehicle body is simplified and production cost is reduced.

When the user inclines the body forwards to enable the two driving components 540 to incline forwards with basically a same angle, the two driving components 540 respectively control the two hub motors 520 to rotate forwards basically at a same speed, so that the posture vehicle 500 moves forwards entirely. When the user inclines the body backwards to enable the two driving components 540 to incline backwards with basically a same angle, the two driving components 540 respectively control the two hub motors 520 to rotate backwards basically at a same speed, so that the posture vehicle 500 moves backwards entirely. When the user enables the inclined angle of the left driving component 540 to be larger than the inclined angle of the right driving component 540, rotating speed of the left hub motor 520 is larger than rotating speed of the right hub motor 520 and then the posture vehicle 500 turns right as a whole. When the user enables the inclined angle of the right driving component 540 to be larger than the inclined angle of the left driving component 540, rotating speed of the right hub motor 520 is larger than rotating speed of the left hub motor 520 and then the posture vehicle 500 turns left as a whole.

Figure 7:
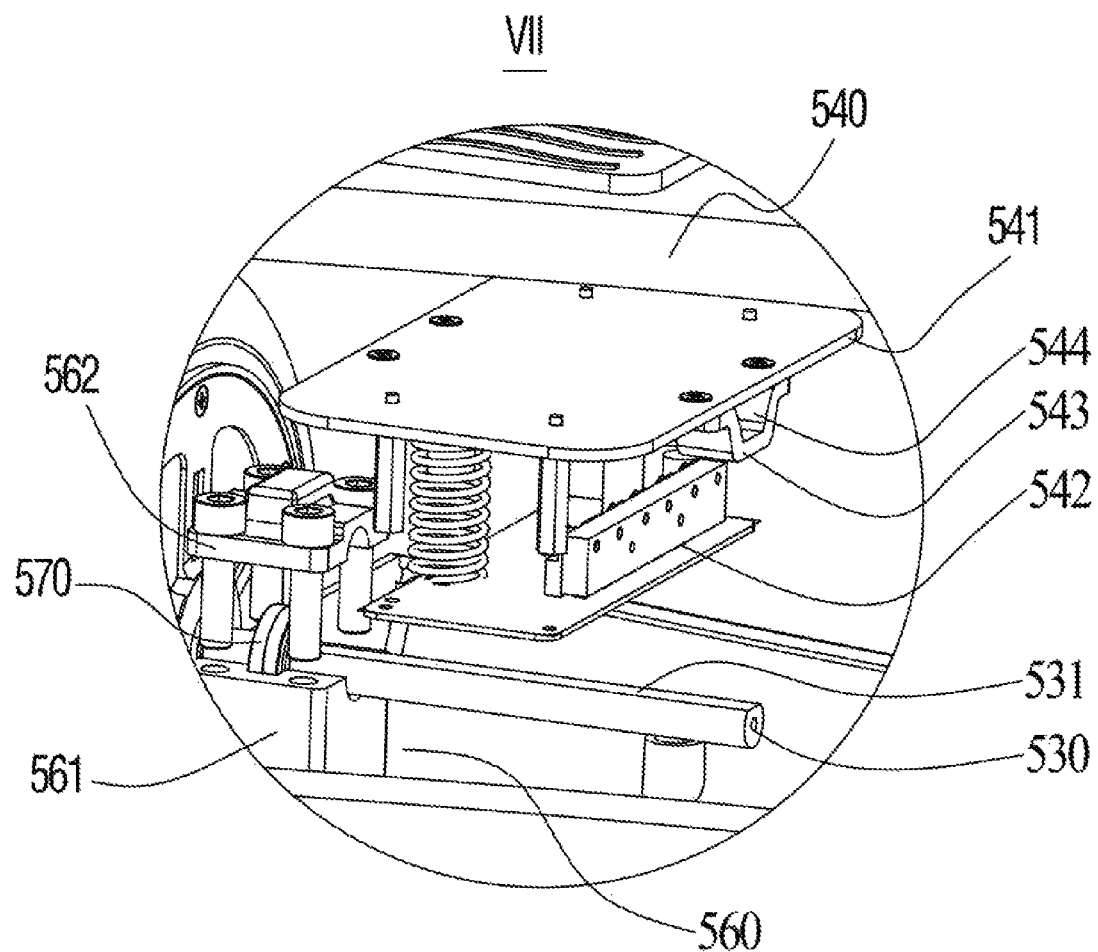
FIG. 7 is an enlargement view of VII position in FIG. 6.

By referring to FIG. 7, FIG. 7 is an enlargement view of VII position in FIG. 6. In the present embodiment, driving component 540 comprises a horizontal plate 541 coupled with the driving component and a control apparatus 542 connected with the horizontal plate 541 and moving with the horizontal plate 541, wherein the horizontal plate 541 is connected with the supporting shafts 530 and the horizontal plate 541 is used for rotating with the supporting shafts 530 relative to the vehicle body 510. The control apparatus 542 is electrically connected with the corresponding hub motor 520. The control apparatus 542 is used for controlling the rotation of the hub motors 520 electrically connected with the control apparatus 542 during incline. The horizontal plate 541 is used for bearing control force of the user, and then driving the driving components 540 to incline as a whole. Connection modes between the horizontal plate 541 and the supporting shafts 530 are diverse, such as welding connection, bolt connection, riveting and the like. In the present embodiment, each driving component 540 also comprises a fixing part 543. The fixing part 543 has a U-shaped structure. Both ends of the fixing part 543 are connected with the horizontal plate 541. The fixing part 543 and the horizontal plate 541 jointly form a fixing space 544. The supporting shafts 530 is installed through a fixing space 544, so as to connect the driving components 540 with the supporting shafts 530. A circumferential surface of each supporting shaft 530 comes into contact with the fixing part 543 and the horizontal plate 541, so as to prevent the driving components 540 to generate radial motion relative to the supporting shafts 530. In the present embodiment, to avoid generating relative rotation between the driving components 540 and the supporting shafts 530, a limiting surface 531 which extends along an axis is installed on each supporting shaft 530. The limiting surface 531 is fitted to a plate surface of the horizontal plate 541. In this way, relative rotation between the driving components 540 and the supporting shafts 530 can be avoided, and then the operation of the driving components 540 is more stable and reliable.

Figure 8:
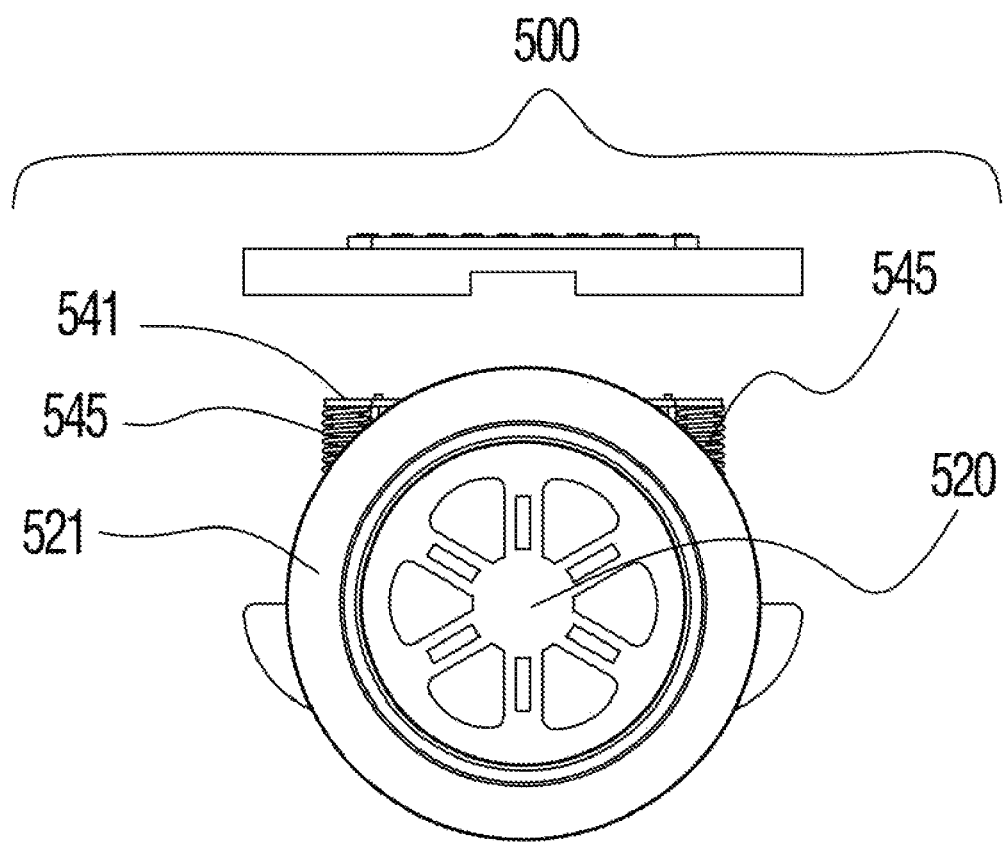
FIG. 8 is a lateral structural schematic diagram of a posture vehicle provided in an embodiment 3 of the present invention.

By referring to FIG. 7 and combining with FIG. 8, FIG. 8 is a lateral structural schematic diagram of a posture vehicle 500 provided in the present embodiment. In the present embodiment, the driving components 540 also comprise two elastic pieces 545 installed on the front side and the rear side of the supporting shafts 530. One end of the two elastic pieces 545 is respectively connected with the front end and the rear end of the horizontal plate 541. When the horizontal plate 541 is inclined forwards, the elastic piece 545 on the front end of the horizontal plate 541 is touched against the vehicle body 510 to limit the forward inclined angle of the horizontal plate 541, so that the horizontal plate 541 will not generate a too large inclined angle forwards.

Meanwhile, the elastic piece helps for the horizontal plate 541 to restore to a horizontal position, thereby enhancing the safety of the posture vehicle 500. When the horizontal plate 541 is inclined backwards, the elastic piece 545 on the rear end of the horizontal plate 541 is abutted against the vehicle body 510 to limit the backward inclined angle of the horizontal plate 541, so that the horizontal plate 541 will not generate a too large inclined angle backwards. Meanwhile, the elastic piece helps for the horizontal plate 541 to restore to a horizontal position, thereby enhancing the safety of the posture vehicle 500. It can be understood that in other embodiments, two elastic pieces 545 can also be connected with the vehicle body 510 and are touched against the horizontal plate 541 when the horizontal plate is inclined forwards or backwards. In the present embodiment, the elastic pieces 545 are springs. It can be understood that in other embodiments, the elastic pieces 545 can also be other apparatuses having elasticity, such as elastic rubber blocks and the like.

By referring to FIG. 6 again, the posture vehicle 500 also comprises pedals 550. The pedals 550 are installed on openings of the vehicle body 510. The pedals 550 are used for the user to step on. The user drives the driving components 540 through the pedals 550 to rotate. To realize the function, the pedals 550 can be pivoted to the openings of the vehicle body 510. The pedals 550 can also be installed and fixed at the openings of the vehicle body 510, and the pedals 550 are made of flexible material. In this way, when the user applies force to the pedals 550, the pedals 550 are deformed, and then drive the horizontal plate 541 to incline forwards or backwards. The pedals 550 are installed and fixed at the openings of the vehicle body 510, thereby enhancing the entire sealing property of the posture vehicle 500.

By referring again to FIG. 7, in the present embodiment, a supporting seat 560 is respectively installed on the left side and the right side in the vehicle body 510. Bearings 570 are installed in the supporting seats 560. The supporting shafts 530 are installed through the bearings 570 in the corresponding supporting seats 560. The supporting shafts 530 are supported through the supporting seats 560 and the bearings 570, so as to enhance the bearing capability of the supporting shafts 530. Meanwhile, the supporting shafts 530 can rotate more smoothly. In the present embodiment, each supporting seat 560 comprises a seat body 561 fixed and connected with the vehicle body 510, and a cover body 562 detachably connected with the seat body 561. Semicircular accommodating grooves (not shown in the figure) are respectively formed in the seat body 561 and the cover body 562. The bearings 570 are embedded into the accommodating grooves in the seat body 561 and the cover body 562. Then, the seat body 561 and the cover body 562 are connected together. In this way, the bearings 570 are firmly installed on the supporting seats 560. In the present embodiment, the seat body 561 and the cover body 562 are connected through bolts.

In the present embodiment, two hub motors 520 are respectively installed on the left side and the right side of the vehicle body 510. In other embodiments, two hub motors 520 can also be oppositely installed in the vehicle body 510, and are located between two driving components 540. In this way, the spacing between the two hub motors 520 is shortened, so that a turning radius of the posture vehicle 500 is smaller, which is suitable for travel in a narrow space. In this case, two hub motors 520 are located between both feet of the user during use. To avoid friction between the hub motors 520 and legs of the user, two hub motors 520 can be obliquely installed. Axes of the two hub motors 520 are intersected and form an included angle, so that a spacing between upper ends of the two hub motors 520 is larger than a spacing between lower ends of the two hub motors 520. In this way, more space is reserved for a user's legs, thereby avoiding friction between the hub motors 520 and legs of the user, and enhancing safety.

Embodiment 4

Figure 9:
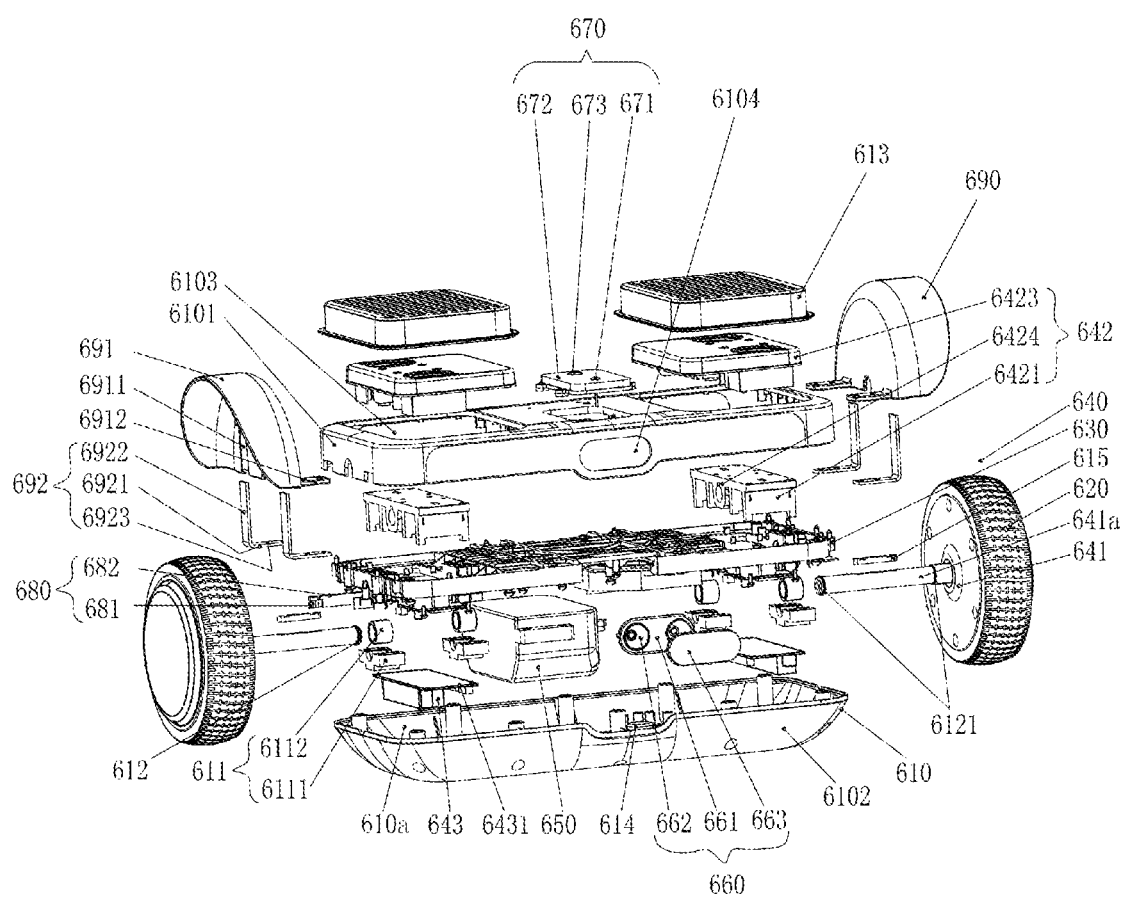
FIG. 9 is a lateral structural schematic diagram of a posture vehicle provided in an embodiment 4 of the present invention.

By referring to FIG. 9, the present embodiment provides a posture vehicle 600. The posture vehicle 600 provided in the present embodiment comprises a vehicle body 610 and two wheels 620 installed on two opposite sides of the vehicle body 610, wherein the posture vehicle 600 also comprises a supporting frame 630 and two driving apparatuses 640 used to control the rotation of wheels 620. Two driving apparatuses 640 respectively correspond to two wheels 620 one to one. The vehicle body 610 comprises an upper shell 6101 and a bottom shell 6102 connected with the upper shell 6101. The upper shell 6101 and the bottom shell 6102 are enclosed to form an inner space 610a for containing the supporting frame 630. Each driving apparatus 640 comprises a hub motor 641, a control component 642 and a driving component 643. The hub motor 641 is installed in each wheel 620 and has a connecting shaft 641a. The connecting shaft 641a is rotatably supported on the supporting frame 630. The control component 642 comprises a swinging bracket 6421 which is connected with the connecting shaft 641a in a relative non-rotation manner, and a pedal 6423 fixed and connected above the swinging bracket 6421 and used for treading on. The driving component 643 is installed in the inner space. The driving component 643 comprises a control board 6431 used for enabling the hub motors 641 to rotate when the pedal 6423 rotates around the axis of the connecting shaft 641a relative to the vehicle body 610. The control board 6431 is electrically connected with the hub motors 641. The support frame 630 has two swinging bracket empty slots 631 for housing the swinging brackets 6421. Two swinging bracket empty slots 631 and two swinging brackets 6421 respectively correspond to each other one to one.

In the above posture vehicle 600, the vehicle body 610 adopts an integral structure. The pedals 6423 are fixed and connected to the swinging brackets 6421. The swinging bracket 6421 and the connecting shaft 641a are connected in a relative non-rotation manner. The pedals 6423 and the swinging brackets 6421 can swing around the axes of the connecting shafts 641a relative to the vehicle body 610. When the pedals 6423 rotate around the axes of the connecting shafts 641a relative to the vehicle body 610, the control board 6431 drives the corresponding wheel 620 to rotate. In this way, the structure of the posture vehicle 600 is smooth, operation is easy, and use safety is good.

By referring to FIG. 9, the posture vehicle 600 provided in the present embodiment comprises a vehicle body 610, a left and a right wheels 620, a power supply 650, a supporting frame 630 and a left and a right driving apparatuses 640. The vehicle body 610 has an integrated structure. Wheels 620 are respectively installed on the left side and the right side. Each wheel 620 is respectively connected with the vehicle body 610 through a driving apparatus 640. In the present embodiment, the vehicle body 610 comprises an upper shell 6101 and a bottom shell 6102. The upper shell 6101 and the bottom shell 6102 are connected and fixed with each other through all existing fixed connection modes such as screws, clamping and the like, and an inner space 610a is encircled by the upper shell 6101 and the bottom shell 6102. The supporting frame 630 can be made of aluminum alloy material. The supporting frame 630 and a power supply 650 are fixed in the inner space 610a. The supporting frame 630 and the upper shell 6101 are connected and fixed. The power supply 650 provides electric power for all electrical apparatus elements of the entire vehicle. Each driving apparatus 640 comprises a hub motor 641, a control component 642 and a driving component 643. The number of the power supply 650 is, but not limited to one. One power supply 650 is adopted for respectively supplying power for two hub motors 641 and two driving components 643. The power supply 650 can be provided with a charging interface (not shown in the figure).

Specifically, the hub motor 641 are installed in the corresponding wheel 620 and have connecting shafts 641a. The connecting shafts 641a extend to the inner space 610a of the vehicle body 610 and can be rotatably installed on the supporting frame 630. The control component 642 comprises a swinging bracket 6421 and a pedal 6423 for treading on. The swinging bracket 6421 and the connecting shaft 641a are connected in a relative non-rotation manner, and are connected and fixed above the swinging bracket 6421. Two pedal empty slots 6103 respectively corresponding to two pedals 6423 are formed in a surface of the upper shell 6101. The pedals 6423 are installed in the pedal empty slots 6103 and at least partially installed through the surface of the upper shell 6101. It is easy to understand that the wheels 620 are rotatably installed on the supporting frame 630 of the vehicle body 610 through the connecting shafts 641a of the hub motors 641. Driven by the hub motors 641, the wheels 620 rotate and fore-and-aft movement and left-and-right turning of the vehicle body 610 are realized. The connecting shafts 641a are rotatably installed on the supporting frames 630. The swinging bracket 6421 and the connecting shaft 641a are connected in a relative non-rotation manner. Namely, the pedals 6423 and the swinging brackets 6421 can swing forward and backward around the axes of the connecting shafts 641a relative to the vehicle body 610 by a preset angle. Then, the rotating speed of the hub motors 641 is correspondingly controlled according to the change of the swinging angle of the pedals 6423.

The driving components 643 comprise a control board 6431 and a plurality of sensors (not shown in the figure). The control board 6431 is electrically connected with a plurality of sensors, a power supply 650 and corresponding hub motors 641. The control board 6431 can be any existing circuit board capable of controlling the corresponding hub motors 641 to drive the corresponding wheels 620 to rotate according to sensing signals transmitted by the sensors. The plurality of sensors are, but not limited to gyroscopes and acceleration sensors. It is deserved to mention that the posture vehicle 600 provided in the present embodiment adopts a self-balance principle; the pedals 6423 are installed by a preset angle through the gyroscopes; the pedals 6423 are automatically reset when not tread on through the connecting shafts 641a of the hub motors 641, so that the surfaces of the pedals 6423 are basically parallel with a horizontal plane; the acceleration sensors and the gyroscopes jointly detect the movement state of the posture vehicle 600; and the control board 6431 receives sensing signals of the acceleration sensors and the gyroscopes to control whether the hub motors 641 change states, to realize acceleration or deceleration.

By referring to FIG. 9, each connecting shaft 641a is connected to the supporting frame 630 through two groups of bearing components 611. The two groups of bearing components 611 are respectively installed on two opposite sides of the swinging bracket 6421. Each group of bearing components 611 comprises a pressing block 6111 fixed to the supporting frame 630, and a bearing 6112 sleeved on the connecting shaft 641a. The bearing 6112 is installed between the pressing block 6111 and the supporting frame 630. In the present embodiment, two bearings 6112 are sleeved on each connecting shaft 641a. A connecting slot 6424 through which the connecting shaft 641a is installed is formed in the swinging bracket 6421. Two bearings 6112 are respectively located on the left side and the right side of the swinging bracket 6421. Each bearing 6112 is assembled to the supporting frame 630 through the pressing block 6111. The pressing block 6111 is locked to the supporting frame 630 through screws and other fasteners, and then the connecting shafts 641a of the hub motors 641 are rotatably installed on the supporting frame 630.

By referring to FIG. 9, each connecting shaft 641a is provided with a limiting component 612 for limiting the connecting shaft 641a to separate from the supporting frame 630. The limiting component 612 comprises two limiting members 6121 respectively fixed to the connecting shaft 641a. The bearings 6112 are installed between two limiting members 6121. In the present embodiment, the limiting members 6121 are, but not limited to clamping springs. An outer diameter of each clamping spring is larger than an inner diameter of each bearing 6112. Two clamping slots (not shown in the figure) are formed in the connecting shaft 641a. The two clamping slots are respectively located at two end parts of the connecting shaft 641a. The clamping springs are clamped in the corresponding clamping slots, thereby limiting the movement of the connecting shaft 641a in an axial direction, to prevent separation of the connecting shaft 641a from the supporting frame 630.

By referring to FIG. 9, an illuminating apparatus 660 is installed on the front side of the vehicle body 610. The posture vehicle 600 also comprises an illuminating control apparatus 670. The illuminating control apparatus 670 comprises a driving plate (not shown in the figure), a photosensitive sensor 671, a status indicator lamp plate 672 and a power switch 673. The photosensitive sensor 671, the status indicator lamp plate 672 and the power switch 673 are installed on the upper shell 6101. The driving plate is installed and fixed on the supporting frame 630. The status indicator lamp plate 672 is respectively and electrically connected with the photosensitive sensor 671 and the illuminating apparatus 660. In the present embodiment, a front lamp empty slot 6104 is formed in the front side of the upper shell 6101. The illuminating apparatus 660 is installed in the inner space 610a. The illuminating apparatus 660 comprises a front lamp fixing frame 661, two high-power lamp beads 662 installed on the front lamp fixing frame 661, and a front lamp cover 663. The front lamp cover 663 is connected and fixed with the front lamp fixing frame 661 and covers the lamp beads 662. The front lamp cover 663 may be a PVC transparent board or a glass board. The front lamp cover 663 is exposed to the vehicle body 610 from the front lamp empty slot 6104. A surface cover empty slot 6105 is installed in the middle of the upper surface of the upper shell 6101. The status indicator lamp plate 672 is installed in the surface cover empty slot 6105. The photosensitive sensor 671 and the power switch 673 are installed on a front surface of the status indicator lamp plate 672 (i.e., the upper surface in the figure). The driving board can be any existing circuit board capable of controlling the illuminating apparatus 660 to operate according to sensing signals of the photosensitive sensor 671. In this way, when the user uses the posture vehicle 600, according to intensity of light rays, the illuminating control apparatus 670 can control to turn on and to turn off a front lamp.

By referring to FIG. 9, a tail lamp component 680 is installed at the rear side of the vehicle body 610. The tail lamp component 680 comprises lamp bars 681 and a tail lamp cover 682 that covers outer sides of the lamp bars 681. The lamp bars 681 are electrically connected with the control board 6431. In the present embodiment, the tail lamp component 680 is installed on the rear side of the vehicle body. The number of the lamp bars 681 is, but not limited to two. Two lamp bars 681 respectively correspond to two wheels 620 one to one. Each lamp bar 681 is electrically connected to corresponding control boards 6431, thereby reflecting a travel state of the posture vehicle 600 through different display states under the control of the control boards 6431 to remind surrounding people and enhancing use safety. It can be understood that according to the travel states of the posture vehicle 600, such as advancing, retreating, left turning, right turning and the like, two lamp bars 681 can present simultaneous normal illumination and flashing or only one lamp bar 681 normally illuminates, flashes or does not illuminate so as to communicate travel state information for surrounding people.

By referring to FIG. 9, fender components 690 are respectively installed on two opposite sides of the vehicle body 610. Each fender component 690 comprises a fender 691 covered on the corresponding wheel 620, and a bent connecting piece 692. The connecting piece 692 comprises two folding edges vertical to each other. One folding edge is connected and fixed with the fender 691, and the other one is connected and fixed with the supporting frame 630. In the present embodiment, the connecting piece 692 is an approximately L-shaped structural bending plate and comprises two folding edges. The two folding edges respectively include a first folding edge 6921 of a fixing hole 6923 and a second folding edge 6922 connected with the first folding edge 6921. An inserting slot 6911 for containing the second folding edge 6922 is formed in the fender 691. A connecting sheet 6912 is formed at one side of the fender 691 near the vehicle body 610. A through hole corresponding to the fixing hole 6923 is formed in the connecting sheet 6912. Screws and other fasteners successively penetrate through the fixing hole 6923 and the through hole to fixedly install the connecting piece 692 and the fender 691 on the supporting frame 630.

By referring to FIG. 9, a pedal pad 613 is respectively covered on each pedal 6423. The pedal pad 613 is fixed to the upper shell 6101. The pedal pad 613 is made of flexible material and a surface of the pedal pad 613 can be designed with a skid-proof structure. In this way, certain protection can be performed for the pedal 6423. In addition, in the use process of the user, frictional force with the vehicle body 610 can be increased and use safety is enhanced.

By referring to FIG. 9, a loudspeaker 614 is fixed to the bottom shell 6102. A bluetooth plate (not shown in the figure) is fixed to the supporting frame 630. The loudspeaker 614 is electrically connected with the bluetooth plate so as to communicate with outside devices and then enable the loudspeaker 614 to play audio files.

By referring to FIG. 9, the connecting shaft 641a and the swinging bracket 6421 are connected through a limiting flat key 615. In the present embodiment, a limiting hole for partially placing the limiting flat key 615 is formed in the connecting shaft 641a. A limiting groove corresponding to the limiting hole is formed in the swinging bracket 6421 in the inner wall of the connecting slot 6424. The limiting flat key 615 is adopted so that the connecting shaft 641a and the swinging bracket 6421 are connected in a relative non-rotation manner, so that the swinging bracket 6421 and the pedal 6423 can realize forward and backward swing relative to the vehicle body 610.

INDUSTRIAL APPLICABILITY

In the posture vehicle provided in embodiments of the present invention, each wheel comprises a stator fixing shaft pivoted to the vehicle body and a rotor-driven wheel connected to the stator fixing shaft. The vehicle body can rotate around the rotor-driven wheel relative to the stator fixing shaft. The driving components are fixed and connected to the stator fixing shafts. The driving components can swing with the stator fixing shafts relative to the vehicle body. In this way, the driving components and the wheels are in the same operating plane. Namely, in a using process, the user treads on the wheels, thereby eliminating interference of a balance state of the vehicle body to an output signal of the driving components, i.e., an entire driving mode of the posture vehicle is only stimulated by a balance signal source of the driving components relative to the horizontal plane. Therefore, the user only needs to operate and control the driving components so as to generate an angle relative to the horizontal plane, thereby sending a driving signal to the corresponding rotor-driven wheel to obtain a corresponding travel state. This connection mode enhances the sensitivity of the driving components for judging the balance signal, so that the user is easy to operate and especially easy to get on the vehicle, the vehicle body structure is simplified and production cost is reduced.

In the posture vehicle provided in embodiments of the present invention, the driving components are connected with the supporting shafts. Because the driving components can rotate around axes of the supporting shafts relative to the vehicle body with an external force, the driving components and the vehicle body can rotate in a mutually independent way. Through the openings formed in the vehicle body, both feet of the user can directly control the driving components to incline forwards or backwards. As the driving components do not need to rotate with the vehicle body, rotation of the driving components is sensitive, and then a control signal is sent sensitively to enable the motors to change rotation states rapidly. In addition, because rotating axes of the driving components are coaxial with operation axes of the motors, an inclined angle of the driving components can be converted into the control signal of the motors accurately and simply, and then rotation of the motors is accurate, so that the user is convenient to operate and especially easier to get on the vehicle, the vehicle body structure is simplified and production cost is reduced.

The above contents are only preferred embodiments of the present invention, but are not intended to limit the present invention. Any modification, equivalent replacement, improvement and the like made within spirits and principles of the present invention shall be included in the protection scope of the present invention.

What is claimed is:
1. A posture vehicle, comprising:
a vehicle body;
two wheels pivoted to the vehicle body;
pedals installed on the vehicle body; and
two driving components installed in the vehicle body which drives the wheels to rotate through the pedals;

wherein each of the wheels comprises a stator fixing shaft pivoted to the vehicle body and a rotor-driven wheel connected to the stator fixing shaft;

each of two driving components is electrically connected to its respective rotor-driven wheel;

two driving components are installed in parallel with an certain interval in the vehicle body and respectively fixed and connected to the stator fixing shafts of their corresponding rotor-driven wheels; and when there is an inclined angle generated between each driving component and the horizontal plane, a driving signal is output to the corresponding rotor-driven wheel so that the driving components tend to achieve a dynamic balancing status.

2. The posture vehicle according to claim 1, wherein the driving components comprise a horizontal plate coupled with the driving components and the horizontal plate is fixed on and connected to the stator fixing shaft in the vehicle body;

two elastic pieces respectively installed in the pedal at the front end and at the rear end of the horizontal plate which touch against an interior wall of the vehicle body when there is an inclined angle between the horizontal plate and the horizontal plane;

a control system, adapted with the horizontal plate, outputs a driving signal to the rotor-driven wheels when there is an inclined angle between the horizontal plate and the horizontal plane; and the control system is electrically connected to the rotor-driven wheels.

3. The posture vehicle according to claim 2, wherein a first supporting seat for supporting the stator fixing shaft is installed in the vehicle body; a first bearing is installed in the first supporting seat; and the stator fixing shaft is installed throughout the first bearing.

4. The posture vehicle according to claim 3, wherein a second supporting seat for supporting the stator fixing shaft is further installed in the vehicle body; the second supporting seat and the first supporting seat are oppositely installed; a second bearing is installed in the second supporting seat; and the stator fixing shaft is respectively installed through the first bearing and the second bearing and is between the first supporting seat and the second supporting seat.

5. The posture vehicle according to claim 2, wherein two rotor-driven wheels are respectively installed at both sides of the vehicle body, and are mutually parallel; and two driving components are located between the two rotor-driven wheels.

6. The posture vehicle according to claim 2, wherein the two rotor-driven wheels are installed in the vehicle body, and present an acute included angle; and two driving components are respectively located at outer sides of the two rotor driving wheels.

7. The posture vehicle according to claim 2, wherein the vehicle body comprises a top housing and a bottom housing which are buckled vertically; and the pedals are two flexible pedal regions installed on the top housing and are corresponding to the driving components vertically.

8. The posture vehicle according to claim 7, wherein the flexible pedal regions are provided with skid-proof grains.

9. The posture vehicle according to claim 1, wherein the driving components comprise a horizontal plate coupled with the driving components and the horizontal plate is fixed on and connected to the stator fixing shaft in the vehicle body; two elastic pieces respectively installed in the vehicle body which touch against the front end and the rear end of the horizontal plate when there is an inclined angle between the horizontal plate and the horizontal plane, and a control system, adapted with the horizontal plate, outputs a driving signal to the rotor-driven wheels when there is an inclined angle between the horizontal plate and the horizontal plane; and the control system is electrically connected with the rotor-driven wheels.

10. The posture vehicle according to claim 9, wherein a first supporting seat for supporting the stator fixing shaft is installed in the vehicle body; a first bearing is installed in the first supporting seat; and the stator fixing shaft is installed throughout the first bearing.

11. The posture vehicle according to claim 10, wherein a second supporting seat for supporting the stator fixing shaft is further installed in the vehicle body; the second supporting seat and the first supporting seat are oppositely installed; a second bearing is installed in the second supporting seat; and the stator fixing shaft is respectively penetrated through the first bearing and the second bearing and is erected between the first supporting seat and the second supporting seat.

12. The posture vehicle according to claim 9, wherein two rotor-driven wheels are respectively installed on both sides of the vehicle body, and are mutually parallel; and two driving components are located between the two rotor-driven wheels.

13. The posture vehicle according to claim 9, wherein the two rotor-driven wheels are installed in the vehicle body, and present an acute included angle; and two driving components are respectively located at outer sides of the two rotor-driven wheels.

14. The posture vehicle according to claim 9, wherein the vehicle body comprises a top housing and a bottom housing which are buckled vertically; and the pedals are two flexible pedal regions installed on the top housing and are corresponding to the driving components vertically.

15. The posture vehicle according to claim 14, wherein the flexible pedal regions are provided with skid-proof grains.

16. The posture vehicle according to claim 1, wherein two rotor-driven wheels are respectively installed at both sides of the vehicle body, and are mutually parallel; and two driving components are located between the two rotor-driven wheels.

17. The posture vehicle according to claim 1, wherein the two rotor-driven wheels are installed in the vehicle body, and present an acute angle; and two driving components are respectively located at outer sides of the two rotor-driven wheels.

18. The posture vehicle according to claim 1, wherein the vehicle body comprises a top housing and a bottom housing which are buckled vertically; and the pedals are two flexible pedal regions installed on the top housing and are corresponding to the driving components vertically.

19. The posture vehicle according to claim 18, wherein the flexible pedal regions are provided with skid-proof grains.

* * * * *